(12) United States Patent  (10) Patent No.: US 8,100,209 B2
Goldsberry  (45) Date of Patent: Jan. 24, 2012

(54) FRONT BULKHEAD COVER AND AIR FLOW SYSTEM

(75) Inventor: Nicholas Goldsberry, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 12/331,074

(22) Filed: Dec. 9, 2008

(65) Prior Publication Data

US 2009/0242296 A1 Oct. 1, 2009

Related U.S. Application Data

(60) Provisional application No. 61/040,859, filed on Mar. 31, 2008.

(51) Int. Cl.
*B60K 11/00* (2006.01)

(52) U.S. Cl. ..................... 180/68.1; 180/68.31

(58) Field of Classification Search .............. 180/68.1, 180/68.3, 68.4, 69.25, 69.22; 123/41.48, 123/563
See application file for complete search history.

(56) References Cited

U.S. PATENT DOCUMENTS

| | | | | |
|---|---|---|---|---|
| 3,616,871 A | * | 11/1971 | West | 180/68.1 |
| 4,566,407 A | * | 1/1986 | Peter | 123/41.48 |
| 4,646,864 A | * | 3/1987 | Racchi | 180/69.22 |
| 5,022,479 A | * | 6/1991 | Kiser et al. | 180/68.3 |
| 5,564,513 A | * | 10/1996 | Wible et al. | 180/68.3 |
| 5,860,685 A | | 1/1999 | Horney et al. | |
| 5,944,001 A | | 8/1999 | Hutchins | |
| 6,302,228 B1 | * | 10/2001 | Cottereau et al. | 180/68.1 |
| 6,405,819 B1 | | 6/2002 | Ohkura et al. | |
| 6,508,506 B2 | | 1/2003 | Ozawa et al. | |
| 6,578,650 B2 | | 6/2003 | Ozawa et al. | |
| 6,648,399 B2 | | 11/2003 | Ozawa et al. | |
| 6,880,655 B2 | | 4/2005 | Suwa et al. | |
| 7,021,411 B2 | | 4/2006 | Maeda et al. | |
| 7,234,555 B2 | | 6/2007 | Khouw et al. | |
| 7,237,635 B2 | | 7/2007 | Khouw et al. | |
| 7,290,630 B2 | * | 11/2007 | Maeda et al. | 180/68.4 |
| 7,523,798 B2 | * | 4/2009 | Muramatsu et al. | 180/68.1 |
| 2005/0230162 A1 | | 10/2005 | Murayama et al. | |
| 2006/0006011 A1 | | 1/2006 | Khouw et al. | |

* cited by examiner

*Primary Examiner* — Hau Phan
(74) *Attorney, Agent, or Firm* — Mark E. Duell; Rankin Hill & Clark LLP

(57) ABSTRACT

A vehicle bulkhead cover and vehicle front assembly using the cover are described. The vehicle front assembly separates a significant proportion of entrained dirt or water particles from an air flow through the assembly. The resulting air flow can then be directed to an engine air intake.

15 Claims, 3 Drawing Sheets

FRONT BULKHEAD COVER AND AIR FLOW SYSTEM

FIELD OF THE INVENTION

The present invention relates to the field of vehicle front assemblies and particularly, structures for forming particular air flows therein prior to such air entering an engine air intake.

BACKGROUND OF THE INVENTION

It is well known to design air channeling structures in frontal regions of automobiles and direct air into one or more engine intakes, radiators, and/or around the engine.

Although desirable characteristics for air flows to engine intakes and those for radiators share many common attributes such as high flow rates, and maintaining low temperatures; air flows for engine intakes have several additional desirable characteristics. First, such air flows should be free or substantially free, of entrained particles of dirt, dust, water, snow, ice, and the like. Although air directed to an engine intake subsequently passes through one or more filter elements, it is preferred that such air streams be free of entrained particles which would otherwise be collected at the filter elements and thus block or interfere with air flow at that location. It is also desirable that the amount of air directed to an engine intake be relatively high, or at least in excess of demands from the engine.

It is known in the fields of material handling and particularly, in gas-solid separations, that entrained particles can be separated from a moving air flow by causing sudden changes in the direction of the air flow. Due to differences in mass and thus inertia between such particles relative to air, entrained particles can be diverted away from a redirected air flow. Cyclones and labyrinth separators are based upon this phenomenon.

Vehicle designers have incorporated a range of structures for directing air flows from the front and/or underside of a vehicle to an engine intake. For example, US Patent Publication 2005/0230162 describes a front structure for a vehicle that collects and directs air through a tortuous flow path to attempt to rid the air flow from entrained snow or rain.

A significant advance was described in a collection of patents and published patent applications to the same assignee as the present application, namely U.S. Pat. Nos. 7,234,555; 7,237,635; and 2006/0006011 for example. In FIG. 8 of each of these documents, an S-shaped air flow is described in which air is collected behind a grill and then reversed in direction as it passes through a screen provided in a bulkhead cover. After passing through such cover, the air flow is then reversed in direction and sent to an engine intake.

Although the air intake system described in the noted patent documents of the assignee provide numerous benefits, ever-changing vehicle designs and increasingly demanding requirements create a need for yet further improvements.

SUMMARY OF THE INVENTION

The difficulties and drawbacks associated with previous-type systems are overcome in the present method and apparatus for vehicle front assemblies and particularly, structures for forming particular air flows therein prior to such air entering an engine air intake.

In one aspect, the present invention provides an air flow system for a vehicle. The air flow system is adapted to collect air from a frontal region of the vehicle and direct the air to an engine intake. The air flow system comprises at least one air entryway, the at least one air entryway disposed along a frontal region of the vehicle. The air flow system also comprises a passageway in flow communication with the at least one air entryway and disposed downstream of the air entryway. And, the air flow system comprises a cover including a first wall having a screen region, a second wall spaced from the first wall, and a floor extending between the first and second walls. The first and second walls and the floor define a basin. The basin is disposed downstream of the passageway and in flow communication therewith via the screen region. And, the basin is disposed upstream of and in communication with the engine intake.

In another aspect, the present invention provides an air flow system for a vehicle. The air flow system is adapted to collect air from a frontal region of the vehicle and direct the air to an engine intake. The air flow system comprises at least one air entryway disposed along a frontal region of the vehicle. The air flow system further comprises a bulkhead cover including a screened portion. The bulkhead cover is disposed upstream of an engine intake and in flow communication therewith via the screened portion. And, the air flow system comprises a passageway disposed between the at least one air entryway and the bulkhead cover and in flow communication with the at least one air entryway and the screened portion of the bulkhead cover. The passageway includes a plurality of walls spaced from one another and arranged so as to define a flow path wherein air flowing through the passageway from the at least one air entryway to the bulkhead cover undergoes at least two reversals in direction.

In yet another aspect, the present invention provides a bulkhead cover adapted for use in a vehicle engine compartment. The bulkhead cover comprises a generally planar member defining an upper face and an oppositely directed lower face. The bulkhead cover also comprises a basin accessible from an upper face of the planar member and contiguous therewith. The basin includes a first wall extending from the lower face, a second wall facing the first wall and spaced therefrom, the second wall extending from the lower face, and a floor extending between the first and second walls and generally parallel to the lower face. The basin defines a recessed region disposed below the lower face. The first wall defines a plurality of openings adapted to enable and promote passage of an air flow therethrough.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
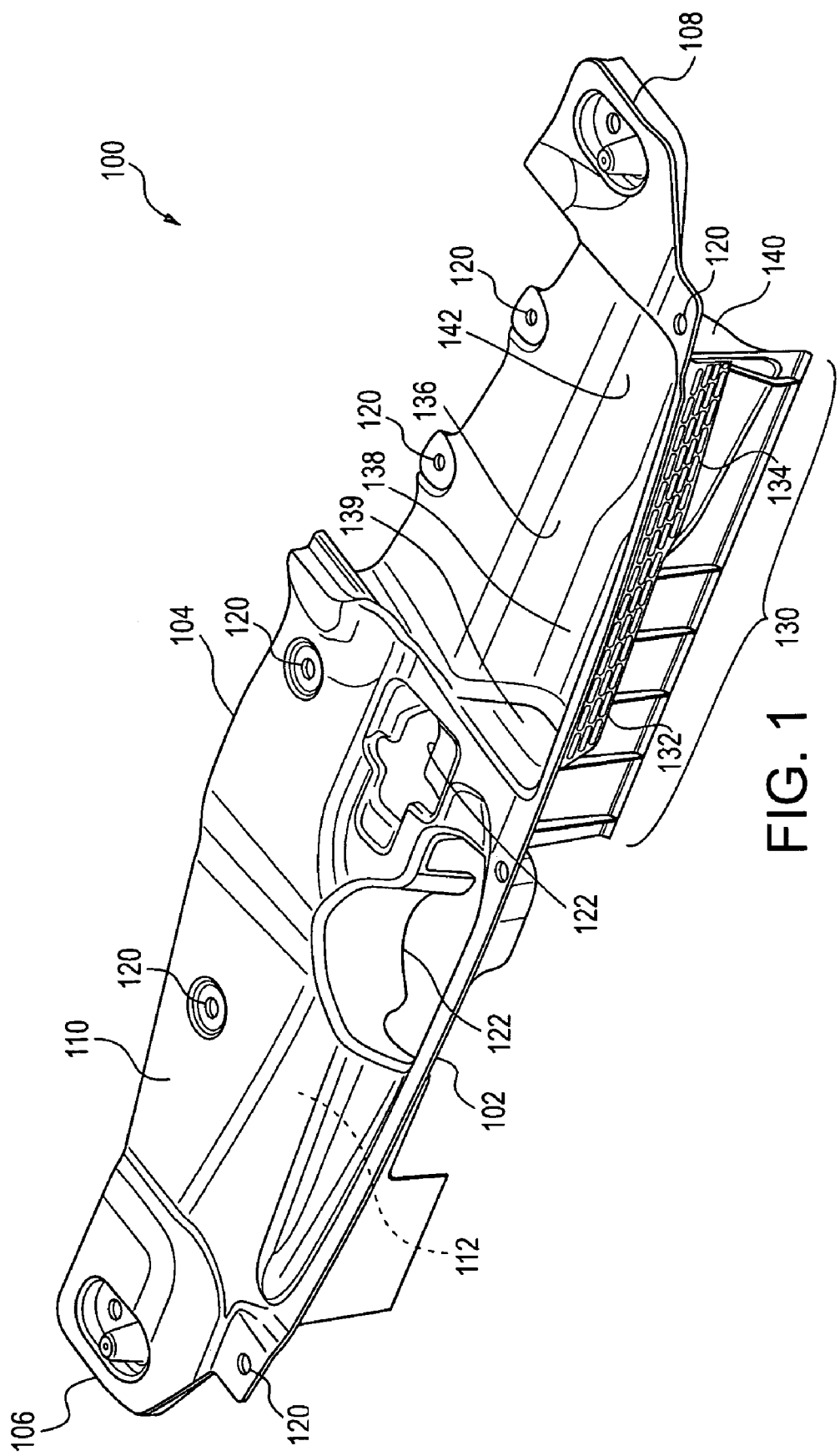
FIG. 1 is a perspective view of a preferred embodiment bulkhead cover in accordance with the present invention.

FIG. 1 is a perspective view of a preferred embodiment bulkhead cover 100 in accordance with the present invention.

The bulkhead cover 100 is generally in the form of a planar member and defines an upper face 110, an oppositely directed bottom face 112, and forward, rearward, and lateral edges 102, 104, 106 and 108, respectively, that extend around the perimeter of the cover 100. The bulkhead cover 100 also defines a plurality of mounting apertures 120 and one or more component openings 122 that extend through the thickness of the cover. As will be appreciated, the mounting apertures 120 are adapted to receive fasteners that extend through the cover 100 and attach the cover to a support structure within the vehicle. The component openings 122 are provided to receive various components or portions of components that may extend through the cover 100. The bulkhead cover 100 is installed within a vehicle, and specifically within an engine compartment. The cover 100 is typically positioned over a radiator and forwardly of the engine. A preferred installation of the cover 100 and its incorporation within a vehicle front assembly is described in greater detail herein.

In accordance with the present invention, the preferred embodiment bulkhead cover 100 includes a basin 130. The basin 130 is preferably a recessed region formed or otherwise defined in the cover 100. The basin 130 may be defined in nearly any region of the cover 100, such as for example, on the left portion of the cover 100, on the right portion of the cover 100 (as depicted in FIG. 1), in the front portion of the cover 100 (as also depicted in FIG. 1), in the rear portion of the cover 100, in the center of the cover 100, or in one or more combinations of these portions. The particular location of the basin 130 primarily depends upon the configuration of an engine air intake and other components within the engine compartment or region of a vehicle. These aspects are described in greater detail in conjunction with FIG. 4, described below.

Referring further to FIG. 1, the basin 130 preferably includes a front basin wall 132 that includes a screen region 134. The basin 130 also includes a rear basin wall 136 spaced rearwardly from the front basin wall 132. The basin 130 also includes a floor 138 extending between the front and rear basin walls 132 and 136, respectively. Depending upon the configuration of the basin, one or more side walls may also be provided, such as a first side wall 139 and a second side wall 140. The side walls extend between the front and rear basin walls 132 and 136. The interior surfaces of the front wall 132, the screen region 134, the rear wall 136, the floor 138, and the side walls 139 and 140, if used, collectively define a basin interior surface 142. The interior of the basin 130 is accessible from the upper face 110 of the cover 100.

Figure 2:
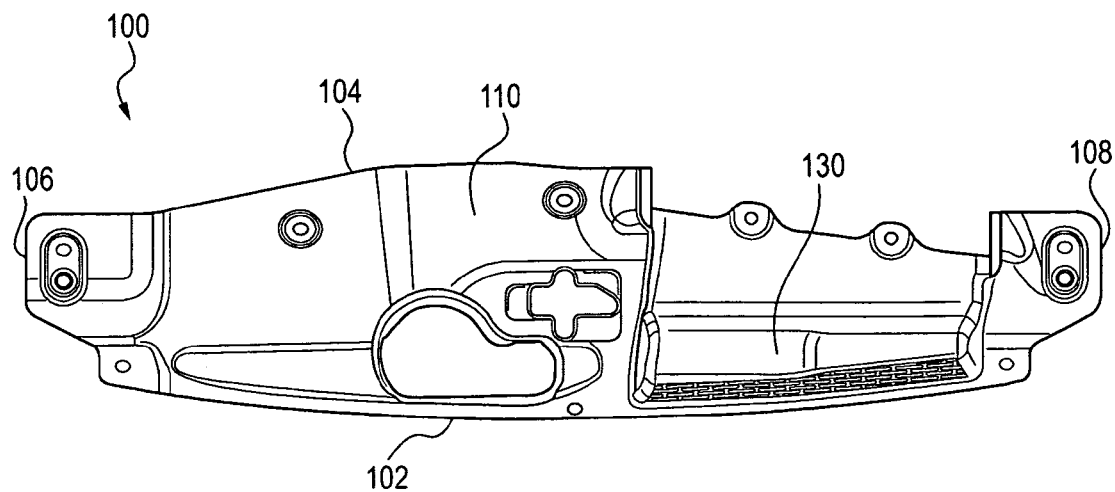
FIG. 2 is a planar view of the preferred embodiment bulkhead cover depicted in FIG. 1.
Figure 3:
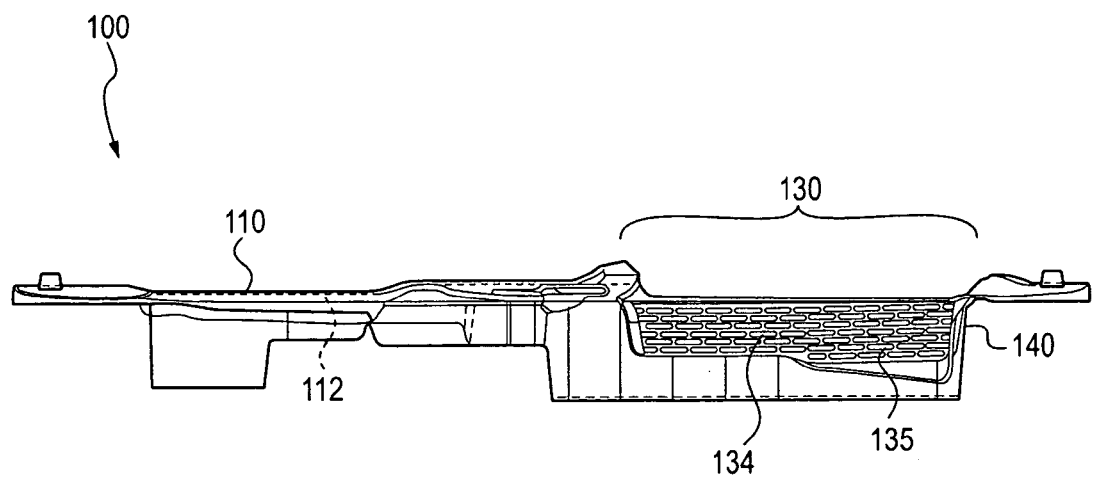
FIG. 3 is a front elevational view of the preferred embodiment bulkhead cover depicted in FIG. 1.

FIG. 2 is a planar view and FIG. 3 is a front elevational view of the preferred embodiment bulkhead cover 100 depicted in FIG. 1. These figures reveal additional structural aspects of the cover 100, and particularly the basin 130. Specifically, FIG. 3 illustrates the screen region 134, and a plurality of apertures 135 defined in that region. The apertures 135 are adapted to enable and promote air flow through the screen region 134, and so are designed to promote minimal frictional resistance to a passing air flow. This may include providing smooth surfaces and rounded edges for the apertures 135. It is preferred that the number of apertures and relative size of each aperture be such that a relatively high percentage of area openings is defined across the screen region. For example, preferably, the percentage of openings or total area of the openings, expressed relative to the total area of the screen region is at least 50%, more preferably at least 60%, and most preferably at least 70%. It will be understood that the upper limit for the proportion of the openings in the screen region is typically limited by a requirement for some type of supporting structure for the screen region. Typically, the area of such structure in the screen region will occupy at least 5% of the total area of the screen region.

A wide array of shapes may be used for the apertures 135 in the screen region 134. The preferred embodiment bulkhead cover 100 depicted in the referenced figures is shown as having slotted or oval shaped apertures 135. This shape is preferred as it provides a relatively high percentage of openings in the screen region 134, yet also enables a relatively strong and rigid support structure to extend across the screen region. However, it will be appreciated that the present invention includes numerous other shapes for the screen apertures 135 such as, but not limited to, circles, squares, rectangles, triangles, polysided shapes, and irregular shapes.

Typically, the screen region 134 may be formed by molding a desired pattern of apertures in the front basin wall 132. However, it is also contemplated that the present invention could utilize one or more wire mesh screen assemblies or other components that are installed in one or more openings formed in the basin wall(s).

The preferred embodiment bulkhead cover 100 is preferably formed in one or more molding operations. Although the cover can be formed by assembling or joining multiple components, it is preferred that the cover 100 and particularly the basin 130 be integrally formed. Thus, the basin walls such as walls 132 and 136 are preferably contiguous with the other portions of the cover 100.

Figure 4:
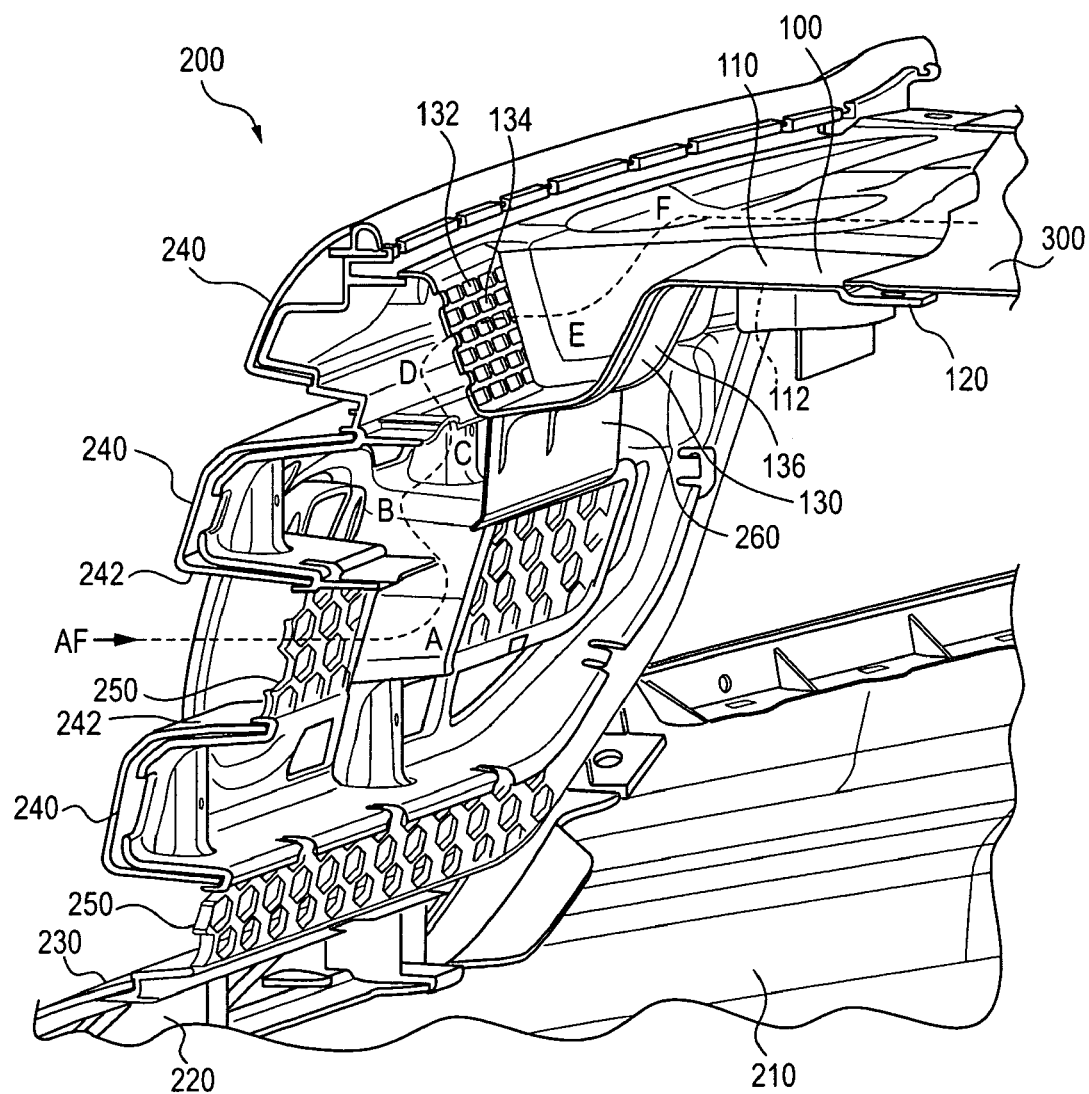
FIG. 4 is a schematic illustration of a preferred embodiment vehicle front assembly using the preferred embodiment bulkhead cover, illustrating the resulting air flow in accordance with the present invention.

FIG. 4 is a schematic illustration of a preferred embodiment vehicle front assembly 200 in a frontal region of a vehicle using the preferred embodiment bulkhead cover 100, illustrating a resulting air flow AF and its path through the assembly in accordance with the present invention. The vehicle front assembly 200 is typically disposed proximate one or more vehicle body panels 210 and is supported by one or more vehicle support members 220. Depending upon the particular configuration of the vehicle, the assembly 200 is generally disposed above a front bumper face 230. The vehicle front assembly 200 comprises one or more vehicle front members 240 that define or otherwise provide air entryway opening(s) 242 that enable air to enter the front region of the vehicle. FIG. 4 illustrates air flow AF entering the assembly 200 through openings 242. One or more grill sections 250 may be disposed across the openings 242 to guard against entry of debris or other items with which the vehicle may come into contact. The grill sections 250, if sufficiently visible from the exterior of the vehicle, may also serve to provide a particular aesthetic function and improve the appearance of the front exterior region of the vehicle.

FIG. 4 illustrates a preferred mounting configuration of the preferred embodiment bulkhead cover 100. The cover 100 is disposed generally above and rearward of the opening(s) 242 through which the air flow AF enters. One or more enclosure panels 260 are preferably provided below the cover 100 and most preferably, directly below the basin 130 of the cover 100. The enclosure panel(s) 260 are preferably oriented vertically, or substantially so, for reasons described later herein. The cover 100 is also preferably disposed frontwardly of an engine air intake 300. The intake 300, or plenum or section thereof, can be directly mounted to the cover 100, and share a common mounting aperture 120.

FIG. 4 also illustrates another feature of the preferred embodiment bulkhead cover 100, and particularly the configuration of the basin 130. As shown in FIG. 4, it is preferred that at least one of the front basin wall 132 and the rear basin wall 136 extend at an angle from the lower face 112 of the cover 100. Preferably, both the front wall 132 and the rear wall 136 extend at an angle or angles, with respect to the lower face 112 of the cover 100. It is preferred that this angle(s) is other than 90°. Generally, the angle(s) at which the front and rear walls extend can be from about 30° to about 60°, and preferably about 45°. Although the present invention includes a basin configuration in which the front and rear basin walls extend transversely, i.e., 90°, from the lower face 112 of the bulkhead cover 100, it is preferred that these walls extend toward one another, so as to reduce the space requirements for the bulkhead cover. In addition, it is believed that configuring the rear basin wall 136 to extend at an angle of from about 30° to about 60° also promotes efficient deflection of an air stream entering the basin as described below.

Before turning attention to additional aspects of the present invention, it is instructive to consider various terminology used herein in describing air flows in and around a vehicle front assembly. Air flowing into a front region of a vehicle is flowing in a direction toward the rear of the vehicle, and so is referred to herein as flowing rearwardly or in a rearward direction. Similarly, air flowing toward the front of the vehicle is referred to as flowing forwardly or in a forward direction. It will be understood that these terms do not require the air flow to travel in a direction parallel with a longitudinal axis of the vehicle, but that the direction of travel merely contain a component vector that is either forward or rearward. Also, the terms "upstream" and "downstream" are periodically used herein to describe locations or components in the air flow path. It will be appreciated that the term upstream refers to a location or component in the path of a flow that is before or prior to something. That is, upstream refers to a location or component in a flow path that is closer to the source of the flow than another location or component. And, the term downstream refers to a location or component in the path of a flow that is after something. Specifically, downstream refers to a location or component in a flow path that is further from the source of the flow than another location or component.

Description will now be provided of a significant feature of the present invention, the unique air flow resulting from the preferred embodiment assembly 200 and use of the preferred embodiment bulkhead cover 100. Referring to FIG. 4, entering air flow is shown as the arrow AF. Air entering the vehicle passes through the grill or grill section 250. The air flows to location A, at which its rearward direction is diverted and preferably reversed by one or more enclosure panel(s) 260 (not shown at this location in FIG. 4). Preferably, the air flow is diverted upward and the direction of the air flow is reversed so that the air flow is now in a forward direction to location B, downstream of location A. At about location B, the direction of the air flow is again reversed so that the air flows in a rearward direction to location C, downstream of location B. One or more interior faces of the vehicle front member 240 preferably divert the air flow at location B, however enclosure panel(s) 260 could also be used. The air flow continues to location C in the vehicle assembly 200, at which the direction of the air is again significantly altered, and preferably reversed by the enclosure panel 260 to a frontward direction to location D, downstream of location C. One or more interior faces of the vehicle front member 240 preferably divert the air flow at location D, however enclosure panel(s) 260 could also be used. From location D, the air flow is again in a rearward direction and enters the front wall 132 of the basin 130 of the cover 100. Specifically, the air flow enters the screen region 134 of the basin 130 and continues to about location E within the basin 130 of the cover 100. At location E, downstream of location D, the direction of the air flow is again altered, typically by the rear basin wall 136. The air flow continues to location F, downstream of location E, at which the air flow is again diverted to a direction consistent with the engine air intake 300. The intake 300 is downstream of location F. The air flow can be diverted at location F by one or more panels, or the underside of the vehicle hood may serve to accomplish such diversion.

The preferred embodiment air flow strategy of the present invention exhibits various features. One feature relates to the number of reversals in air flow direction. Preferably, the present invention front vehicle assembly achieves at least two reversals in air flow direction. That is, the air flow is caused to change to a forward direction at least twice (or change to a rearward direction at least twice) after entering the front vehicle assembly and prior to entering the engine air intake. The use of multiple directional changes, particularly in relatively rapid succession, results in a large proportion of entrained particles to be separated from the air flow. This in turn results in less interference for the air flow at one or more filter elements downstream in the engine air intake because there is less potential for blockage at the filter elements from collected particles. Another feature of the present invention is that after passing through the screen region 134 of the preferred embodiment bulkhead cover 100, the air flow, although diverted in direction, is not caused to reverse in direction. This feature promotes maintenance of velocity of the air flow at this location and thus increases or at least maintains a relatively high total air volume to the engine air intake. Yet another benefit provided by the present invention, is that the majority of the tortuous path provided by the assembly, such as assembly 200, occurs upstream of the basin or prior to passage of air through the bulkhead cover. Thus, a very large proportion of entrained particles have already been separated from the air flow before entering the basin 130 of the preferred embodiment cover 100. This in turn results in less accumulation of dirt, debris, and moisture in the basin and on surfaces of the cover 100.

The present invention such as embodied in the preferred vehicle front assembly 200, can take a variety of different forms. Accordingly, the invention is not limited to the particular structure or resulting air flow shown in FIG. 4. Instead, the present invention includes a wide array of air flow passageway(s) formed or otherwise defined in vehicle front regions, disposed between one or more air entryways typically located along a front region of a vehicle and a bulkhead cover, all of which are disposed upstream of an engine air intake. The passageway of the present invention includes a plurality of spaced apart walls arranged so as to define a flow path wherein air flowing through the passageway from the vehicle air entryway to the engine air intake, and preferably prior to passing through a bulkhead cover, undergoes at least two reversals in direction. The reversals in direction can be reversals in any pair of opposing directions. And so, the present invention includes passageways that cause air flows to undergo at least two reversals in a vertical plane, a horizontal plane, or any planes therebetween, or combinations of planes. Preferably, the passageway is configured to cause an air flow to undergo at least two reversals in direction in a generally vertical plane as depicted in FIG. 4. However, it is preferred that the passageway be configured to cause air flows to undergo at least two reversals in any direction, and most preferably in rearward and forward directions as described herein.

Many other benefits will no doubt become apparent from future application and development of this technology.

All patents, published applications, and articles noted herein are hereby incorporated by reference in their entirety.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. An air flow system for a vehicle, the air flow system adapted to collect air from a frontal region of the vehicle and direct the air to an engine intake, the air flow system comprising:
   at least one air entryway, the at least one air entryway disposed along a frontal region of the vehicle;
   a passageway in flow communication with the at least one air entryway and disposed downstream of the air entryway;
   a cover including a first wall having a screen region, a second wall spaced from the first wall, and a floor extending between the first and second walls, the first and second walls and the floor defining a basin, the basin disposed downstream of the passageway and in flow communication therewith via the screen region, and the basin disposed upstream of and in communication with the engine intake,
   wherein the cover is a bulkhead cover adapted for use in a vehicle engine compartment, the bulkhead cover comprising a generally planar member defining an upper face and the floor; and
   wherein the basin is accessible from the upper face of the planar member and contiguous therewith, the first wall and second wall extending from the planar member, the second wall facing the first wall and spaced therefrom, and the floor generally parallel to the upper face of the planar member, the basin defining a recessed region disposed below the upper face, and the first wall defining a plurality of openings as the screen region, the plurality of openings adapted to enable and promote passage of an air flow therethrough.

2. The air flow system of claim 1 wherein the openings are slotted in shape.

3. The air flow system of claim 1 wherein the percentage of openings in the first wall is at least 50%.

4. The air flow system of claim 3 wherein the percentage of openings in the first wall is at least 60%.

5. The air flow system of claim 4 wherein the percentage of openings in the first wall is at least 8%.

6. The air flow system of claim 1 wherein the passageway includes a plurality of walls spaced from one another and arranged so as to define a flow path wherein air flowing through the passageway from the at least one air entryway to the basin of the cover undergoes at least two reversals in direction.

7. The air flow system of claim 1 wherein the basin further includes a first side wall disposed between the first wall and the second wall and extending between the planar member and the floor, and a second side wall disposed between the first wall and the second wall and extending between the planar member and the floor.

8. The air flow system of claim 1 wherein the second wall extends from the planar member at an angle of from about 30° to about 60°.

9. The air flow system of claim 1 wherein the first wall extends from the planar member at an angle of from about 30° to about 60°.

10. An air flow system for a vehicle, the air flow system adapted to collect air from a frontal region of the vehicle and direct the air to an engine intake, the air flow system comprising:
    at least one air entryway disposed along a frontal region of the vehicle;
    a bulkhead cover including a screened portion, the bulkhead cover disposed upstream of the engine intake and in flow communication therewith via the screened portion; and
    a passageway disposed between the at least one air entryway and the bulkhead cover and in flow communication with the at least one air entryway and the screened portion of the bulkhead cover, the passageway including a plurality of walls spaced from one another and arranged so as to define a flow path wherein air flowing through the passageway from the at least one air entryway to the bulkhead cover undergoes at least two reversals in direction.

11. The air flow system of claim 10 wherein the passageway is oriented and configured to cause air flowing through the passageway to undergo at least two reversals in direction in a vertical plane.

12. The air flow system of claim 10 wherein the passageway is oriented and configured to cause air flowing through the passageway to undergo at least two reversals in rearward and forward directions.

13. The air flow system of claim 10 wherein the bulkhead cover defines a recessed basin, the basin disposed downstream of the passageway and in flow communication therewith via the screened portion.

14. The air flow system of claim 10 wherein the screened portion defines a plurality of apertures slotted in shape.

15. The air flow system of claim 14 wherein the percentage of openings in the screened portion is at least 50%.

* * * * *

UNITED STATES PATENT AND TRADEMARK OFFICE
CERTIFICATE OF CORRECTION

| | | |
|---|---|---|
| PATENT NO. | : 8,100,209 B2 | Page 1 of 1 |
| APPLICATION NO. | : 12/331074 | |
| DATED | : January 24, 2012 | |
| INVENTOR(S) | : Nicholas Goldsberry | |

It is certified that error appears in the above-identified patent and that said Letters Patent is hereby corrected as shown below:

IN THE CLAIMS:

In col. 7, claim 5, line 47, please replace "8" with "70"

Signed and Sealed this
First Day of May, 2012

David J. Kappos
*Director of the United States Patent and Trademark Office*